June 8, 1965 M. WOLFF 3,187,873
DEVICE FOR DELIVERING DISCRETE PIECES OF MATERIAL
TO A TREATMENT STATION
Filed July 19, 1963
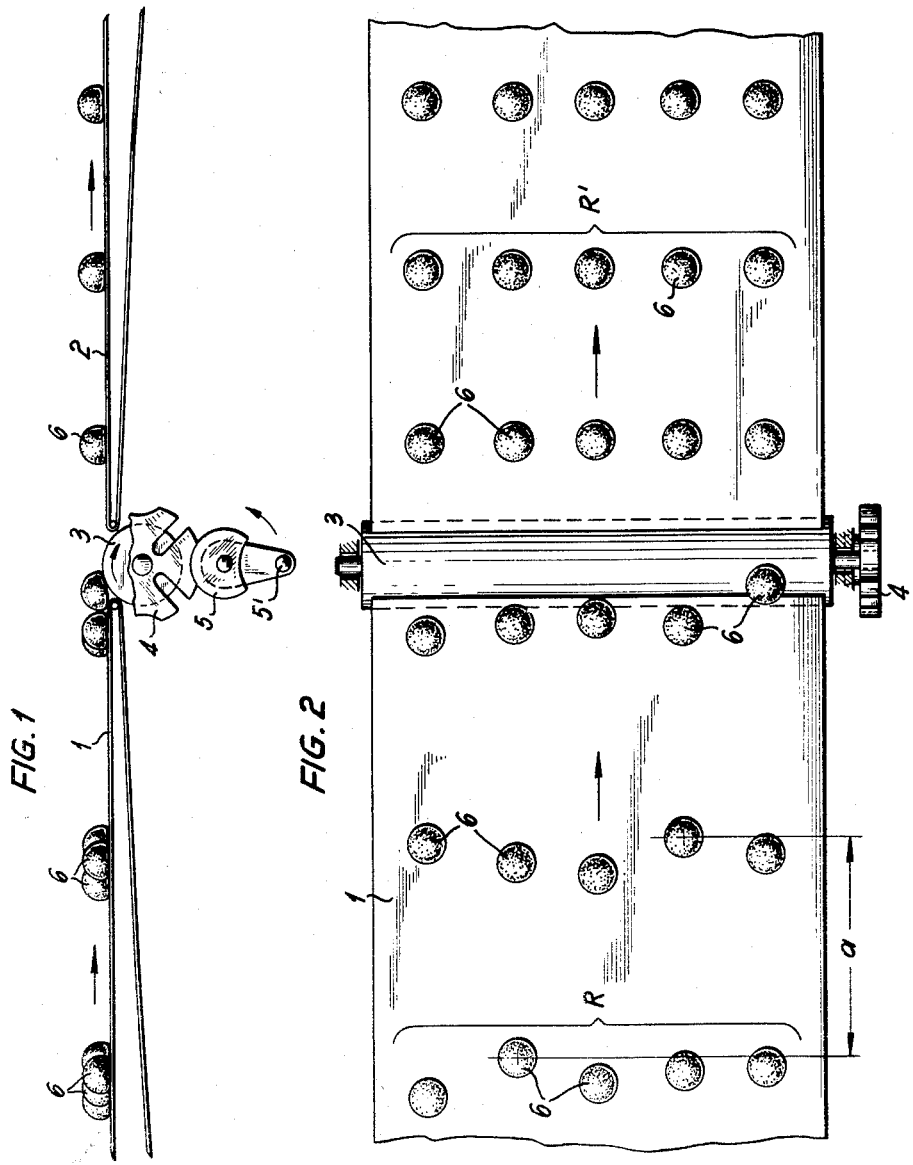
INVENTOR
MANFRED WOLFF
By Hame and Nydick
ATTORNEYS

United States Patent Office 3,187,873
Patented June 8, 1965

3,187,873
DEVICE FOR DELIVERING DISCRETE PIECES OF MATERIAL TO A TREATMENT STATION
Manfred Wolff, Grunbach, Kreis Waiblingen, Germany, assignor to Werner & Pfleiderer, Stuttgart-Feuerbach, Germany, a German company
Filed July 19, 1963, Ser. No. 296,325
Claims priority, application Germany, Nov. 15, 1962, W 33,328
3 Claims. (Cl. 198—29)

The present invention relates to a device for delivering discrete pieces of material such as pieces of dough by means of an intermediate conveyor from a supply conveyor to a feed conveyor leading to a treatment station.

There are already known devices of the general kind above referred to in which a continuously moving intermediate conveyor receives the pieces of material from the supply conveyor and transfers the same to the feed conveyor. In such devices the transfer of the pieces of material from the supply conveyor to the feed conveyor is effected in exactly the same configurational array in which the pieces are delivered by the supply conveyor to the intermediate conveyor. Transport devices of this kind are frequently used for transporting pieces of dough which are disposed in lengthwise spaced transverse rows on the supply conveyor. When the rows of dough pieces are correctly aligned on the supply conveyor, they will reach the intermediate conveyor in the same correct alignment and will also be transferred to the feed conveyor without change in the positions of the pieces relative to each other. However, if the rows of dough are not correctly aligned, for instance due to an irregular placement of the pieces of dough upon the supply conveyor by a dough dividing machine or by an irregular manual placement of the pieces of dough, the same will reach the feed conveyor with the same misalignment which they had on the supply conveyor. In many instances, and in particular, in the baking industry, it is essential that the pieces of dough are delivered to a treatment station in correct alignment. The feed conveyor may lead, for instance, to a baking station or to a fermentation cabinet in which the pieces of dough are guided by means of suspended carriers traveling slowly through the cabinet. Assuming for instance that the treatment station is a suspension type fermentation cabinet, pieces of dough reaching the intake side of such cabinet in more or less irregular fashion may miss the carriers of the cabinet completely, or several pieces of dough may be loaded into the same carrier. Missing or double-loading of the carrier interferes of course with the correct operation of the fermentation cabinet.

It is a broad object of the invention to provide a novel and improved device for delivering discrete pieces of material, such as pieces of dough, in a predetermined aligned relationship to a treatment station.

A more specific object of the invention is to provide a novel and improved device of the general kind above referred to in which misplaced discrete pieces are automatically moved into the aforesaid aligned relationship in reference to each other prior to being delivered to the treatment station.

Another more specific object of the invention is to provide a novel and improved device of the general type above-referred to in which the pieces of material are passed from a supply conveyor to an intermediate conveyor and by the intermediate conveyor to a feed conveyor leading to the treatment station, and in which misplaced pieces of material are automatically forced into the desired aligned relationship when reaching the intermediate conveyor.

Other and further objects, features and advantages of the invention will be pointed out hereinafter and set forth in the appended claims constituting part of the application.

In the accompanying drawing a preferred embodiment of the invention is shown by way of illustration and not by way of limitation.

In the drawing:
FIG. 1 is a diagrammatic side view of a transport device according to the invention, and
FIG. 2 is a plan view of FIG. 1.

Referring now to the figures in detail, the exemplified device according to the invention comprises a supply conveyor 1 and a feed conveyor 2. The supply conveyor should be visualized as being charged with discrete pieces of material such as pieces of dough 6 from any suitable source of supply such as dough dividing or kneading machine, and feed conveyor 2 should be visualized as delivering the dough pieces 6 to a treatment station such as a suspension type fermentation cabinet or a baking station.

The two conveyors 1 and 2 may be of any suitable design and are continuously driven by appropriate drive means (not shown). The return ends of the two conveyors are spaced from each other and an intermediate conveyor 3 is disposed in the gap thus formed. The intermediate conveyor may be a conveyor of any suitable type such as a band conveyor, but a roller conveyor is generally preferable and such conveyor is shown. A roller conveyor affords the advantage that it requires little space and can be simply and inexpensively manufactured.

As will be pointed out hereinafter, it is essential for the invention that conveyor 3 is driven step by step. The step-by-step drive of conveyor 3 may be effected by any suitable drive means such as a motor drive including automatic brake means for periodically stopping the drive. However, a Maltese drive has been found to be particularly advantageous and such drive is shown. The drive comprises a Maltese cross disc 4 secured to the shaft for roller 3 and a crank 5 from which protrudes a pin 5' engageable with the slots of disc 4 to effect stepwise rotation of the same in a well known fashion.

There are shown on conveyor 1 several transverse rows R of pieces of dough 6, in which rows some of the pieces are more or less misaligned. Let it now be assumed that the row closest to conveyor 3 reaches the same while the conveyor is standing still. Obviously the piece of dough closest to the conveyor will reach the conveyor first and will be stopped at the same. Successively all the pieces of dough in the same row will be stopped when they reach the conveyor and finally, all the pieces of dough in one row will be correctly aligned along the conveyor. When the conveyor roller now resumes rotation the pieces of dough in the same row will be lifted by conveyor 3 to conveyor 2 in correctly aligned positions and will continue on conveyor 2 in such correct alignment, as is indicated by row R'.

As it is evident from the previous explanation, the rate of movement of conveyor 1, the periods of stopping and rotation of conveyor roller 3 and the lengthwise spacing $a$ between the rows on conveyor 1 should be so correlated that each row of dough pieces 6 reaches conveyor roller 3 when the same is standing still and that there is sufficient time for alignment of possibly misaligned pieces in each successive row. It is furthermore essential that conveyor roller 3 has finished its period of rotation, or, in other words, completed the transfer of a row of aligned dough pieces from conveyor 1 to conveyor 2 before the foremost piece of dough of the next row reaches conveyor roller 3.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. A device for delivering discrete pieces of material to a treatment station, said device comprising a continuously moving supply conveyor, an intermediate conveyor, and a continuously moving feed conveyor leading to the treatment station, said supply conveyor transporting the pieces of material to said intermediate conveyor and said intermediate conveyor transporting the pieces of material to the feed conveyor, and step-by-step drive means for driving the intermediate conveyor step by step at a predetermined rate of movement in reference to the rate of movement of said supply conveyor, engagement of pieces of material with the intermediate conveyor while the same is standing still forcing pieces displaced in reference to an aligned arrangement of the pieces on the supply conveyor into aligned positions along said conveyor prior to a step of movement of the intermediate conveyor.

2. A device according to claim 1 wherein said step-by-step drive means comprises a step-by-step driven roller.

3. A device according to claim 1 wherein said step-by-step drive means comprises a Maltese cross drive.

References Cited by the Examiner
UNITED STATES PATENTS

| | | | |
|---|---|---|---|
| 2,268,724 | 1/42 | Shackelford | 198—20 |
| 2,679,919 | 6/52 | DeKoning | 198—102 X |
| 3,056,482 | 10/62 | Lanham et al. | 198—30 |
| 3,061,072 | 10/62 | Schwertl | 198—34 |
| 3,115,237 | 12/63 | Atkins | 198—34 |

SAMUEL F. COLEMAN, *Primary Examiner.*